United States Patent [19]
Kakis

[11] Patent Number: 4,707,370
[45] Date of Patent: Nov. 17, 1987

[54] FOOD DEHYDRATION PROCESS

[76] Inventor: Frederic J. Kakis, 1534 Harding St., Orange, Calif. 92667

[21] Appl. No.: 895,726

[22] Filed: Aug. 12, 1986

Related U.S. Application Data

[63] Continuation of Ser. No. 728,946, Apr. 30, 1985, abandoned.

[51] Int. Cl.$^4$ .............................. A23B 7/02; F26B 5/16
[52] U.S. Cl. .......................................... 426/443; 34/9; 34/95
[58] Field of Search ....................... 426/443, 465, 472; 34/6, 9, 71, 94, 95

[56] References Cited

U.S. PATENT DOCUMENTS

| | | | |
|---|---|---|---|
| 2,185,129 | 12/1939 | Maus | 34/9 |
| 3,732,627 | 5/1973 | Wertheim | 34/9 |
| 4,383,376 | 5/1983 | Numamoto | 426/443 |

Primary Examiner—George Yeung
Attorney, Agent, or Firm—Porter, Wright, Morris & Arthur

[57] ABSTRACT

A method for preparing dehydrated and low moisture foods, such as fruits, vegetables and spices, is disclosed. The foodstuff is first pressed to remove a substantial amount of its less tightly bound water, then contacted with an absorbent, if desired while applying pressure to the foodstuff, to remove a substantial amount of its more tightly bound water and provide a low moisture foodstuff. Subjecting this low moisture foodstuff to ambient temperature air drying in a low moisture atmosphere provides a dry-to-the-touch dehydrated foodstuff which retains its flavorful and aromatic volatiles and is resistant to spoilage.

18 Claims, 2 Drawing Figures

FOOD DEHYDRATION PROCESS

This application is a continuation of application Ser. No. 728,946, filed Apr. 30, 1985, now abandoned.

BACKGROUND OF THE INVENTION

This invention relates to a method for preparing dehydrated and low moisture foods, such as fruits, vegetables and spices, quickly and with a minimum expenditure of energy, and to apparatus useful in carrying out this method. This invention further relates to a food dehydration method carried out at low temperatures, so that flavorful and aromatic volatiles are not driven from the product, and yet rapidly enough to prevent consequent spoilage of the food being processed.

Dehydration or drying is a method of food preservation in which water removal is used to control the growth of microorganisms and enzymatic activity that decompose foods in their natural state. Ideally, dehydrated foods are maintained in such a state that they can be reconstituted to approximately their original taste, if not shape, when contacted with sufficient water.

Dehydrated products are easier to handle than the natural products from which they are made, have far greater shelf lives, and are cheaper to ship and store. All of these advantages are particularly important in the case of institutional products such as military rations. Certain dehydrated products, such as onion and garlic powders, are sometimes preferred to their raw precursors, not only for their far greater shelf lives but also for their culinary versatility.

Many dehydrated products are hygroscopic in nature and will remain stable and unspoiled only if kept in a relatively low moisture atmosphere, as is provided, for example, by airtight packaging.

Most modern food dehydration processes are costly in terms of both energy and equipment. Evaporation using hot, dry air, usually produced by fossil fuel combustion, is the most common commercial dehydration method now in use. Hot air evaporation equipment is typically designed to be used for only one type of food product. Such equipment is often underutilized, and thus the cost of dehydration is further increased, especially when the material to be processed is only seasonally available. Dehydration processes other than hot air evaporation, such as freeze-drying, are also known, but require very sophisticated processing machinery which renders them uneconomical for all but a limited number of products.

The poor quality, flavor, aroma and texture of dehydrated products in comparison to the original materials is a further drawback of dehydration. Most of the blandness of dried foods results from the loss of volatile, aromatic, flavor-producing compounds during dehydration. Such losses occur because the amount of heat necessary to remove sufficient moisture also evaporates a substantial portion of the volatiles that give the natural product specific flavor and aroma characteristics. For example, the characteristic flavor and aroma of onions is due to the presence of components such as allyl propyl disulfide, pyruvates and a host of other unstable, volatile sulfur-containing compounds. The amount of pyruvates lost in onions during conventional dehydration may approach as much as 90 percent of the original amount. The adverse economic consequences of such flavor loss are obvious: one needs to use the conventionally dehydrated product in larger amounts than a product dehydrated by a process that minimizes the loss of flavor components to achieve an equivalent flavoring level. The more potent the flavor profile of the dehydrated product, the less one will have to use to achieve a desired result.

Flavor distortion during dehydration also results from air oxidation of labile flavoring components. This is a relatively slow process at low temperatures but the rate of oxidation increases rapidly on heating. Since isolation of the food being processed from the surrounding air is not generally feasible, shorter processing times and lower temperatures are usually required to minimize air oxidation.

Rehydration of dried foods to a condition resembling that of the parent material is often not possible, due to irreversible changes produced when animal or vegetable tissue is exposed to high temperatures. Free drying avoids many of the problems associated with processes utilizing heat, but prpoduces dried foods which tend to have spongy surfaces and is very expensive.

Most of the volatile matter driven from commercially dehydrated products during drying could be retained if processing took place as a lower temperature but, as indicated above, this has not been regarded heretofore as a practical solution because of the lengthy drying times required. The chances of fungal and bacterial contamination are increased as processing time is increased. Then two, certain undesirable oxidative and enzymatic chemical reactions that take place within the foods being processed can only be avoided if the material is treated more rapidly. For instance, when an onion is bruised, a slow enzymatic degradative activity is initiated. This degradation can be circumvented, however, if sufficient moisture is rapidly removed from the onion.

Numerous attempts have been made to overcome the disadvantages inherent in traditional dehydration techniques. Thus, for example, U.S. Pat. No. 4,383,376 teaches the use of various hydrophilic polymer substances which are used, in the form of contact dehydrating sheets placed against the surfaces of protein-containing foods in their natural state, to absorb water from the food. U.S. Pat. No. 3,732,627 discloses a desiccant and membrane combination used out of contact with the food being treated to remove liquids by drawing them off in the form of vapor. U.S. Pat. No. 3,386,838 discloses a process in which bananas are preserved by compressing them between juice-absorbent boards while exposing the boards to sunlight. Since excess fluids are not immediately removed, long processing times, normally 7–8 days, are necessary. Further, the amount of compression employed in this patent's method is so small that all the fluids being removed must either be absorbed or evaporated, and during this time, according to the patent, the fruit may have to be exposed to a sulfuric atmosphere in order to prevent mold formation.

SUMMARY OF THE INVENTION

The present invention relates to a novel process for preparing low moisture and dehydrated foods, particularly fruits, vegetables and spices, at ambient temperatures. In carrying out this process the food, which generally will be in chopped or ground form, is first quickly pressed to force out a substantial amount of the free or less tightly bound water contained in the food. The fluid obtained in this initial pressing step may in many instances have commercial value directly or as an ingredient of other food products such as juices, animal foods and pet foods. The second step of the process of this invention involves indirectly contacting the thus-pressed foodstuff with an absorbent material that has great affinity for water, preferably while applying pressure to maximize mass transfer of aqueous material from the food into the absorbent, to remove a substantial amount of the more tightly bound water present in the foodstuff.

One of the unique features of this invention is that it allows pressure to be applied to the substance being dehydrated with or without pressurizing the absorbent. Eliminating pressure on the absorbent is advantageous when using certain absorbents because it makes moisture transfer more irreversible and prevents contamination of the food by the absorbent.

The product of the absorption step can be termed a low moisture material, and certain of such low moisture materials are directly usable in a number of commercial applications. Complete or substantially complete dehydration of the low moisture material can be achieved by simple air drying at ambient temperature in a low moisture or substantially moisture free environment, e.g., one obtained by the use of normal room air conditioning at a temperature of about 25° C., or one obtainable through the use of dessicated air, etc.

Figure 1:
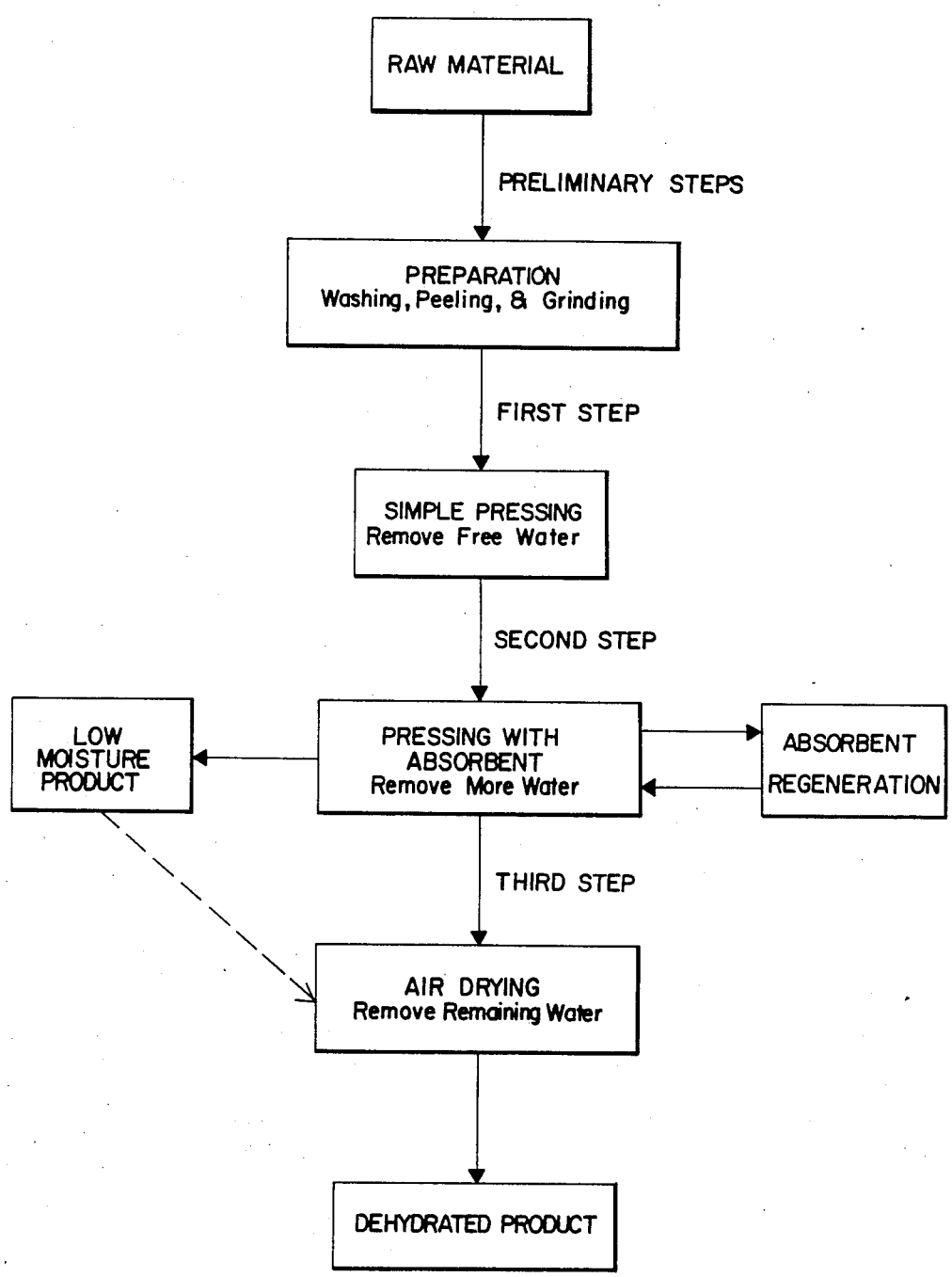
FIG. 1 is a block diagram illustrating the aforementioned steps: simple pressing, absorption and air drying. Raw material preparation and absorbent regeneration steps are also shown in this figure.

In use in the absorption step, the apparatus comprises an outer chamber 1, preferably although not necessarily a cylinder, which houses two substantially concentric pistons 2 and 3. These pistons 2 and 3 also are preferably, although not necessarily, cylindrical, and can be hollow or solid. In any case, they will genreally conform to the interior dimensions of the outer chamber 1. The pistons 2 and 3 can terminate, at their opposing faces, in covers or disks 4 and 5 containing perforations (not shown) to permit moisture from the foodstuff being processed to pass into the absorbent present, and can have spaces 6 and 7 behind these covers or disks 4 and 5 which are defined by (1) the covers or disks 4 and 5, (2) the opposing solid faces 8 and 9 of the pistons 2 and 3 (these solid faces being inherently present when the pistons 2 and 3 are solid, or formed by inserting appropriately shaped solid pieces, e.g., solid disks, into hollow pistons), and (3) the interior surfaces of the pistons 2 and 3 disposed therebetween. These spaces 6 and 7 can be loaded with absorbent 10 in any suitable manner, e.g., by providing removable perforated covers or disks 4 and 5. Or, if the upper piston 2 is hollow, absorbent can merely be poured into its interior in the desired amount.

Figure 2:
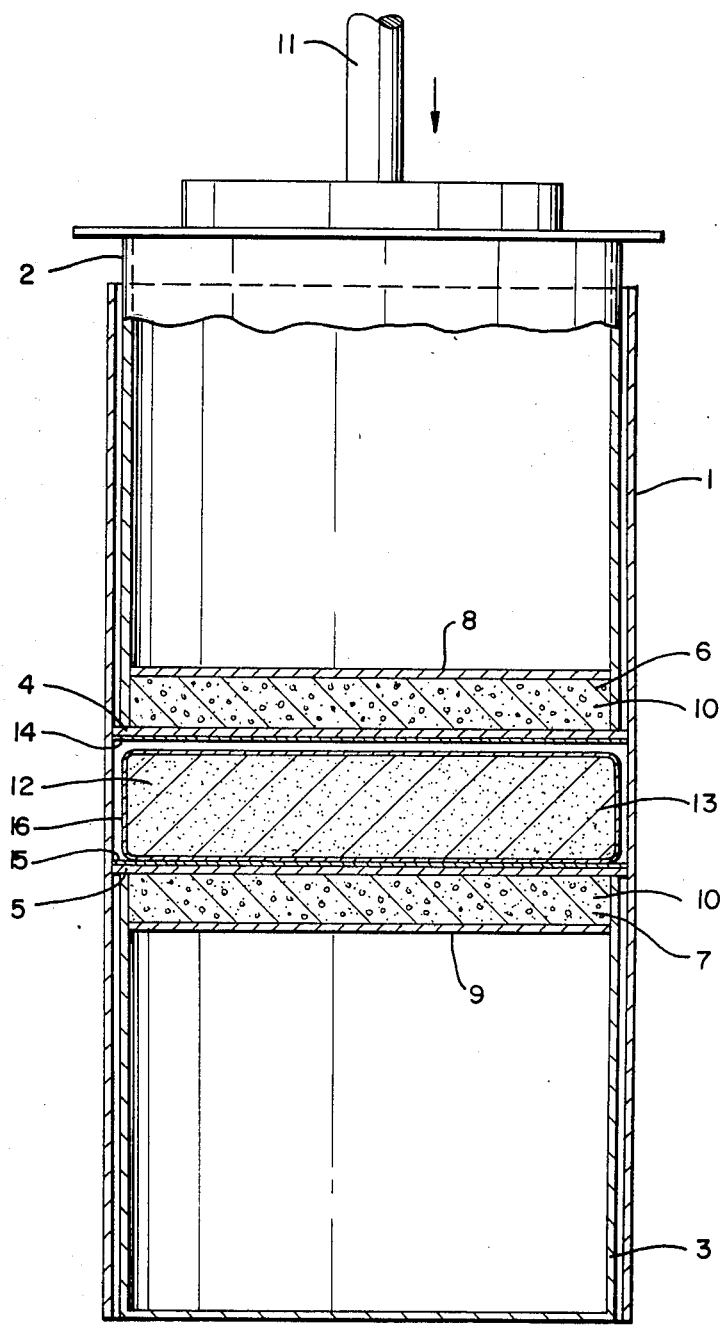
FIG. 2 is a schematic illustration of a pressing apparatus which can be used, if desired, in carrying out the absorption step of the present invention and which can also be used, with minor modifications, in carrying out the initial pressing step as well.

As shown in FIG. 2, the upper piston 2 is a movable piston which transmits pressure from a press or other pressure producing device 11 to food 12 placed in the area 13 defined by (1) the perforated covers or disks 4 and 5 which constitute the opposing faces of the pistons 2 and 3 and (2) the interior surface of the chamber 1. The lower piston 3 is static, and its face 5 serves to support the food 12 being processed. However, other suitable arrangements, including one piston moving other than vertically, e.g., horizontally or diagonally, two movable pistons, etc. may also be employed to transmit pressure to the food.

The perforated covers or disks 4 and 5 can, if desired, be faced on their inner or outer surfaces with filter means, such as filter paper, filter cloth, etc, for example outer filter means 14 and 15 as shown, to further insulate the food 12 from coming into direct contact with the absorbent 10.

The food 12 being processed, in this case a foodstuff which has been subjected to an initial pressing step to remove a substantial amount of its less tightly bound water, is loaded into a flexible, porous container or sack 16, preferably one made of finely woven cloth, e.g., nylon cloth, or stainless steel mesh, and placed in the area 13 between the opposing piston faces 4 and 5. The pressure producing device 11 can then be activated to move the movable piston 2 towards the static piston 3 to exert the desired degree of pressure on the food 12 to drive additional moisture from the food 12 into the absorbent 10.

If desired, several portions of food can be interlayered with layers of absorbent in the area 13 and processed simultaneously, with the absorbent preferably, although not necessarily, being a laminated absorbent and with the food preferably, although again not necessarily, being contained in a flexible, porous container or sack.

In an alternative unillustrated embodiment the pistons 2 and 3 can each be hollow, e.g. hollow cylinders capped with perforated covers or disks. In such an embodiment the foodstuff can be placed atop the static piston (either with or without a layer of absorbent between it and the static piston and, if absorbent is employed beneath the food, with filter means between it and the food), filter means will be placed atop the food or inside the movable piston, or both, and a layer of absorbent will be placed atop the filter means either inside or outside the movable piston. Placing the absorbent inside the movable piston again permits pressure to be exerted on the foodstuff without exerting pressure on the food.

Only one of the pistons 2 and 3 can terminate in a perforated cover or disk, with the other terminating in a solid face or surface. For example, in the initial pressing step, which can also be accomplished with the apparatus shown in FIG. 2 with slight modifications, the absorbent will be eliminated and either the upper or movable piston 2 or the lower or static piston 3, preferably the former, will be one which terminates in a solid face rather than a perforated disk. Drain means (not shown) will be present to remove the expelled liquid.

DETAILED DESCRIPTION OF THE INVENTION

The inventive method of this invention comprises an initial pressing step followed by an absorption step and, if desired, an air drying step. Additional steps may be desirable in some instances. For example, it may be necessary, in order to provide a more homogenous product, to remove undesirable parts of the foodstuff, such as peels, roots, or skins, prior to the initial pressing step. Also, it is usually desirable to chop or grind the foodstuff prior to subjecting it to the initial pressing step to provide more surface area for mass transfer and to make it easier to carry out the pressing step.

The pressing step takes advantage of the ease with which a substantial amount, indeed, in many cases, the vast bulk of the water in food can be removed. Pressing is a cheap and rapid alternative to heat evaporation or absorption, and thus increases efficiency whenever it can be employed in the process of this invention. While the initial pressing step cannot remove the more tightly bound water, such water accounts for a much smaller percentage of the total water in the starting product than the substantial amount of less tightly bound water removed by the initial pressing step. Any type of pressing apparatus may be used as long as it is designed to retain the food being dehydrated and allow the expelled fluids to escape. A simple hydraulic press, which can often be employed to carry out all the pressing operations, compares quite favorably in operating cost to a kiln or other sophisticated drying unit.

Removing the less tightly bound water by pressing allows the subsequent absorption step to be carried out more efficiently. Water absorbent materials are better able to remove a substantial amount of the more tightly bound water from the food to be processed when their excess absorbing capacity is not taken up by free water previously removed by the pressing step. A much stronger diffusion driving force is obtained when the available sites for absorption adjacent to the food material are maximized. Since much less absorbent bulk is necessary when the excess moisture is removed in the initial pressing step, the total amount of absorbent material necessary is greatly reduced by employing a pressing step prior to absorption.

There is usually a substantial amount of solid particulate matter dissolved or suspended in the free fluid removed by the initial pressing step, and care should be taken to avoid the loss of such solids. Solids recovery can be accomplished by employing techniques known in the art, and depending upon the value of these solids, it may be desirable to provide a separate processing step for their recovery. Also, in many instances, the fluids obtained in this step have commercial value and may be used directly or as ingredients of other products.

The second step of the inventive method advantageously employs highly absorbent materials to attract a substantial amount of the moisture that remains after the initial pressing step has been completed. In fruits and vegetables, some of this moisture is very tightly bound in the capillary structures within the food. The rest of the water present is less tightly bound free water, which is used by the plant to transport and maintain most if its nutrients in solution. Most of this free fluid can be removed in the initial pressing step. Contact with the absorbent provides a means for rapidly removing bound water. As indicated above, the efficiency of the absorption step may be increased by applying pressure to the food product during its contact with the absorbent material.

Any of a number of commercially available absorbents can be used in practicing this invention. The chosen absorbent will preferably be non-toxic, since it will generally be placed in contact with the food being processed. However, a procedure which involves loading the food into a sack which can consist of a fine nylon or stainless steel mesh and placing filter paper discs on both sides of the sack may be employed to preclude direct contact between a foodstuff and an absorbent and prevent the transfer of chemicals from the absorbent to the food. Also, the process of this invention permits differential application of pressure to the food without simultaneously pressurizing the absorbent. This is accomplished, as indicated above, by locating the absorbent behind the inner surfaces of the perforated discs of the pistons that comprise the food press while the material to be squeezed is placed between the outer surfaces of these pistons. This arrangement allows pressure to be selectively applied to the food, thus making moisture transfer an irreversible process and precluding the diffusion of absorbent materials into the food.

Absorbent materials that can be cheaply regenerated, i.e., those capable of being re-dried to a condition of absorbency similar or equal to that of the starting material, may offer additional advantages, particularly since the absorbents employed in practicing the process of the present invention are a primary processing expense. One class of such materials that can be easily regenerated is silica gels.

A preferred absorbent material is particulate SGP 150, a non-toxic copolymer of starch, acrylamide and sodium acrylate which forms a gel upon contact with water, sold by Henkel Corporation. The gelled polymer is water insoluble, will retain absorbed water even after vigorous agitation, and has an unusually high capacity for absorbing water; one gram of SGP 150 polymer will absorb 600–1000 ml. of deionized water. Water absorption capacity diminishes, however, as the ionic concentration of the solution increases. For example, one gram of SGP 150 polymer will absorb only 65–90 ml. of 1% saline solution, but this is still adequate for purposes of the present invention.

According to the Food and Drug Administration, SGP 150 absorbent polymer is considered safe for food contact since it has not been possible to detect levels of acrylonitrile, even in such low amounts as 0.05 parts per million, in the polymer or in water which has been contact with the polymer.

Laminated SGP 150 polymer is particularly easy to work with and has the advantage of providing uniformly distributed polymer which can be placed across the surface of the material to be dried. Furthermore, its water absorption capacity, in the present application, was unaffected by pressure. This product is available as a very thin layer of polymer sandwiched between two paper layers. One or several layers of such laminate may be required, depending upon the food being processed and the processing conditions.

Another useful group of absorbents includes those particulate silica gels, particularly Syloid 244 F.P., a synthetic amorphous silica having other uses in the food industry, sold by the Davison Chemical Division of W. R. Grace & Co.

All the steps in the process of the present invention are conducted rapidly and at ambient temperatures, preferably from about 20° C. to about 30° C. As a result, most of the volatile compounds which give foods much of their flavor are retained in the dehydrated product, and flavor distortion due to air oxidation is minimized, giving products superior in quality (flavor, taste, resistance to spoilage, etc.) to that of products produced by prior art processes.

The initial pressing step generally can be carried out in ten minutes or less, but pressing time is not critical. Pressures ranging up to about 8,000–10,000 psi or higher will be used.

The absorption step can be carried out with no pressure applied (simple juxtaposition of foodstuff and absorbent) or at pressures ranging up to about 8,000–10,000 psi or higher, and generally will be completed in approximately ten minutes to one hour, depending upon the absorbent used and the amount of pressure applied.

Pressure, e.g., pressures ranging from about 8,000–10,000 psi, may be applied during the absorption step by any conventional means, e.g., by means of a hydraulic press. As indicated above, when the absorption step is carried out under pressure, a press having one or several layers of absorbent material affixed to the vegetable contacting members of the pressing chamber may be used. Further, stainless steel or nylon mesh sacks and plain filter papers, filter cloths, etc. can be used to separate these absorbent layers from direct contact with the foodstuff.

The absorption step of the present invention is followed, if desired, by simple air drying, at ambient temperature (e.g., at room temperature, or about 25° C.) in a low moisture or substantially moisture free environment, such as is obtainable using normal room air conditioning or dessicants, of the product obtained from the second step. Thus, for example, the cake obtained from the absorption step can simply be spread onto a support made of wire mesh and allowed to air dry.

The drying time in this air drying step is dependent upon the material being dried and the time allotted to the absorption step. It is usually possible to complete the entire process (all three steps) in 24 hours or less. At the end of that period a stable product dry to the touch is obtained, whose appearance, flavor and aroma are closer to those of the fresh food than is the case with other conventionally dehydrated products.

In order that those skilled in the art can more fully understand the present invention, the following examples are set forth. These examples are given solely for purposes of illustration, and should not be considered as expressing limitations unless so set forth in the appended claims. All parts and percentages are by weight, unless otherwise stated.

EXAMPLE 1

One hundred and twenty-eight grams of ground fresh spinach were loaded into a nylon mesh sack and placed between a perforated static piston and a solid moving piston in a food press. Both pistons and all the other parts of the food press were made of stainless steel. External pressure (8,000–10,000 psi) was then applied to the system through a hydraulic jack. The jack was mounted on metal frames so that it would remain immobile during the pressing stage. The activated jack exerted pressure directly on top of the moving piston, forcing it downward and thus squeezing the spinach resting on top of the perforated face of the lower or static piston. The temperature was 24° C. This operation took about 10 minutes. As a result of this first pressing 101 grams of fluid was lost (ca. 79% of the original mass).

The cake from the first pressing (27 grams), was transferred to another nylon mesh sack and returned to the apparatus and placed between two pistons. In this instance, however, the solid moving piston used in the initial step was replaced by a perforated piston of the same configuration. Also, in the absorption step the nylon sack containing the food was sandwiched on both sides by a layer of filter paper followed by several layers of SGP 150 absorbent copolymer in laminated form (ca. 3 grams). Pressure was applied as before for a period of one hour. At the end of that time an additional 12 grams of fluid were lost. Thus in the two steps 88.5% of the original mass was lost.

The low moisture product obtained from the absorption step (14.72 grams) was spread out on a metal screen and allowed to air dry at 26° C. for 18 hours. At the end of this time 8.5 grams of a stable product, dry to the touch and having a natural appearance and color, were obtained. Thus ca. 93% of the original mass was lost during the entire three step dehydration process.

EXAMPLE II

Six samples of ground spinach ranging in weight from 50–100 grams were subjected, in turn, to the pressing and absorption steps described in Example I. Syloid 244, SGP 150 and SGP 150 in laminated form were used in the absorption step. The spinach samples lost 76–79% of their original weight in the first pressing step and 9–12% in the absorption step. After air drying for a period of 18–24 hours at 24°–26° C. temperature, dry products that had lost a total of 89–94% of their original weights were obtained.

EXAMPLE III

Six samples of ground leeks ranging in weight from 50–100 grams were subjected to the initial pressing step described in Example I. The leeks were found to have lost 75–78% of their original mass in this first pressing step. The pressed leeks were then subjected to an absorption step, utilizing SGP 150 absorbent in laminated form either in the single arrangement described in Example I or in multiple arrangements involving 2-3 alternating layers of absorbent and leeks. After the absorption step, the samples were found to have lost an additional 9–12% of their original weight.

After 5-8 hours air drying time at 25° C. dry leak samples were obtained. The total weight loss for the three step process was in the range of 93–95%.

EXAMPLE IV

Eighty-one grams of ground onions were subjected to the initial pressing step as described in Example I. At the end of this step the residue weighed 18.5 grams, thus 62.5 grams of fluid were eliminated (77% of the original mass). After the second step (absorption), which was carried out as described in Example I, the sample lost another 10.1 grams (12.5% of the original weight). Thus the total weight loss for the two steps was 89.5% of the original.

After air drying at 27° C. for 12 hours, 3.4 grams of dry onions were obtained. This represents a total weight loss of 96%.

EXAMPLE V

Six samples of 200 grams each of ground onions were subjected, in turn, to the pressing step described in Example I. The onions were found to have lost an average of about 78% of their total mass during the pressing step.

Syloid 244 was then used as the absorbent in these runs, with absorption being carried out in all other respects as described in Example I. Two grams were placed on the top disc and five grams on the bottom disc. After one hour, the onions used in the six runs had lost a total of between 88 and 91% of their initial mass. After air drying for 18 hours at 24° C., dry samples ranging in weight from 8–12 grams were obtained. Thus, the total loss of weight for the entire process was 94–96% of the original.

EXAMPLE VI 118.6 grams of ground fresh parsley were subjected to the pressing and absorption steps described in Example I. SGP 150 in laminated form (4grams) was used, except that in the absorption step a multilayer arrangement, with the sample distributed in three nylon sacks and interspersed alternatively with layers of the absorbent, was used. A 53% weight loss was observed after the initial pressing step and an additional 22% loss occurred after the absorption step.

After air drying at 26° C. for 18 hours, 15.4 grams of dry material were obtained. Thus, a total weight loss of 86.5% was observed for the entire process.

EXAMPLE VII 62.6 grams of ground fresh dill were subjected to the pressing and absorption steps described in Example I. The sample lost 61% of its original weight after the first step and 14% after the absorption step.

After air drying at 25° C. for six hours, 9.2 grams of dry material were obtained. Thus, the total weight loss for the entire process was 85%.

EXAMPLE VIII

Forty grams of ground oregano were subjected to the pressing and absorption steps described in Example I, except that Syloid 244 F.P. (6 grams) were used in the absorption step.

Forty percent of the original weight was lost after the first step and 28% after the absorption step. After air drying for 18 hours at 24° C., 9.2 grams of dry material were obtained. Thus, a total weight loss of 77% of the original was observed for the entire process.

EXAMPLE IX 39.6 grams of ground fresh basil were subjected to the pressing and absorption steps described in Example I. The sample lost 40% of its weight during the pressing step and 22% during the absorption step. After fifteen hours at 26° C., 6.1 grams of dry material were obtained. Thus, the sample lost 85% of its original weight in the three step process.

EXAMPLE X 63.2 grams of ground fresh thyme were subjected to the pressing and absorption steps described in Example I, except that 5 grams of Syloid 244 were used as the absorbent in the absorption step. After the initial pressing step the sample lost 32% of its original weight. After the absorption step the sample lost an additional 25% of its original weight. After air drying at 26° C. for 18 hours, 18 grams of dry material were obtained. Thus, the total weight loss for the three step process was 72% of the original.

EXAMPLE XI 96.5 grams of ground carrots were subjected to the pressing and absorption steps described in Example VI. The sample lost 60% of its weight in the first step and another 26% in the absorption step. After air drying at 27° C. for 24 hours, 8 grams of dry material were obtained.

This represents a total weight loss, for the entire three step process, of 91% of the original.

The above discussion and related illustrations of this invention are directed primarily to preferred embodiments and practices thereof. It will be readily apparent to those skilled in the art, however, that numerous changes and modifications in the actual implementation of the concepts described herein can readily be made without departing from the spirit and scope of the invention as defined by the following claims.

I claim:

1. A process for dehydrating a foodstuff of plant origin comprising:
   (1) pressing said foodstuff to remove a substantial amount of the water present in said foodstuff;
   (2) contacting, once more under pressure, the thus-pressed foodstuff with a water absorbent to remove, by absorption, a substantial amount of the remaining water present in said foodstuff and provide a low moisture foodstuff, wherein there is a water permeable barrier between said water absorbent and said foodstuff, and further wherein said water is transferred irreversibly to said water absorbent; and
   (3) subjecting the thus-obtained low moisture foodstuff to air drying in a low moisture atmosphere to provide a dehydrated product.

2. A process as described in claim 1 wherein said foodstuff is chopped or ground prior to being pressed.

3. A process as described in claim 2 wherein said absorbent is a silica gel.

4. A process as described in claim 3 wherein said silica gel is employed in particulate form.

5. A process as described in claim 2 wherein said absorbent is a gelled polymer employed in the form of a laminate.

6. A process as described in claim 5 wherein said foodstuff is spinach.

7. A process as described in claim 5 wherein said foodstuff is leeks.

8. A process as described in claim 5 wherein said foodstuff is onions.

9. A process as described in claim 5 wherein said foodstuff is parsley.

10. A process as described in claim 5 wherein said foodstuff is dill.

11. A process as described in claim 5 wherein said foodstuff is oregano.

12. A process as described in claim 5 wherein said foodstuff is basil.

13. A process as described in claim 5 wherein said foodstuff is thyme.

14. A process as described in claim 5 wherein said foodstuff is carrots.

15. A process for preparing a low moisture foodstuff of plant origin comprising:
   (1) pressing said foodstuff to remove a substantial amount of the water present in said foodstuff, and
   (2) contacting, once more under pressure, the thus-pressed foodstuff with a water absorbent to remove, by absorption, a substantial amount of the remaining water present in said foodstuff and provide a low moisture foodstuff, wherein there is a water permeable barrier between said water absorbent and said foodstuff, and further wherein said water is transferred irreversibly to said water absorbent.

16. A process as described in claim 15 wherein said foodstuff is chopped or ground prior to being pressed.

17. A process as described in claim 16 wherein said absorbent is a silica gel.

18. A process as described in claim 16 wherein said absorbent is a gelled polymer employed in the form of a laminate.

* * * * *